Sept. 5, 1961     E. N. MORTENSON ET AL     2,999,015
METHOD AND APPARATUS FOR USE IN THE
MANUFACTURE OF MIXED FERTILIZER Filed Jan. 22, 1957     2 Sheets-Sheet 2

EVERETT N. MORTENSON
ERNEST G. WAGNER, JR.
INVENTORS

BY R. L. Story
ATTORNEY

United States Patent Office 2,999,015
Patented Sept. 5, 1961

2,999,015
METHOD AND APPARATUS FOR USE IN THE MANUFACTURE OF MIXED FERTILIZER
Everett N. Mortenson, Chicago, Ill., and Ernest G. Wagner, Jr., Portland, Oreg., assignors to Swift & Company, Chicago, Ill., a corporation of Illinois
Filed Jan. 22, 1957, Ser. No. 635,216
7 Claims. (Cl. 71—43)

The present invention relates to a method and apparatus for use in the manufacture of a mixed fertilizer or the like.

In the fertilizer industry, one of the most commonly used nitrogen supplying substances is a solution of ammonia-ammonium nitrate. This is prepared by oxidizing anhydrous ammonia to nitric acid, thereafter forming ammonium nitrate by neutralization of the nitric acid with ammonia and finally adding excess ammonia so as to form a concentrated ammonia-ammonium nitrate water solution. The ammonia-ammonium nitrate can be prepared so that it shows no tendency to crystallize out and from the standpoint of cost, ease of handling, and high analysis, is often preferred to ammonium sulphate or liquid anhydrous ammonia as an available nitrogen source. Two commercially available ammonia-ammonium nitrate solutions which are typical of those commonly used are nitrogen solution 2 and nitrogen solution 3. Their analyses are:

|  | Total N, percent | Ammonium Nitrate | Free $NH_3$, Percent | Water, Percent |
|---|---|---|---|---|
| Nitrogen Solution 2 | 41.01 | 65.0 | 22.2 | 12.8 |
| Nitrogen Solution 3 | 41.05 | 55.5 | 26.3 | 18.2 |

Ammonia-ammonium nitrate solutions are especially favored as fertilizer additives because of their low cost. They may be combined with the superphosphate-containing solid materials used in fertilizers by simply spraying the solution into the mixer wherein the solid materials are being tumbled. The ammonia-ammonium nitrate solutions are added in quantities such that the free ammonia supplied is in stoichiometric relationship to the calcium di-hydrogen phosphate in the superphosphate. Monocalcium phosphate ($Ca(H_2PO_4)_2$) constitutes about 23–29% of the total superphosphate weight and furnishes the majority of the $P_2O_5$ content with a minor amount being furnished by the dicalcium phosphate. The $P_2O_5$ content of superphosphate is in the range of 17–20%. The reaction occurring when the amount of solution is limited to the stoichiometric requirements of ammonia is as follows:

$$Ca(H_2PO_4)_2 + 2NH_3 + CaSO_4 \rightarrow 2CaHPO_4 + (NH_4)_2SO_4$$

In the event that more ammonia is added to single superphosphate than is represented by the above equation, tricalcium phosphate and hydroxy-apatite are formed. Both of these compounds contain phosphorus in a relatively unavailable state and are of little agronomic value.

This drastically limits the amount of nitrogen which can be added to single superphosphate by neutralization with a solution of ammonia-ammonium nitrate. The N to $P_2O_5$ ratio obtainable by the neutralization of single superphosphate with nitrogen solution 2 is about .45 to 1.0. A similar limitation arises in the case of triple superphosphate which contains about 45% $P_2O_5$ and which is ammoniated according to the following equation:

$$Ca(H_2PO_4)_2 + 2NH_3 \rightarrow CaHPO_4 + (NH_4)_2HPO_4$$

Additional ammoniation beyond this point yields the undesirable tri-calcium phosphate. This reaction similarly obtains a ratio of N to $P_2O_5$ of only about .45 to 1.0. This is, of course, discounting the small amount of additional ammonia nitrogen which will be absorbed by any free phosphoric acid which may be present. Since this acid will generally be present in amounts in the vicinity of 2–3% of the superphosphate weight, it has only a minor effect on the amount of nitrogen absorbed.

Theoretically, acid substances could be added to a superphosphate or a mixture containing it to absorb free ammonia and thereby increase the N to $P_2O_5$ level in the product. This, of course, would allow for the use of additional ammonia-ammonium nitrate solution. However, the commonly used fertilizer acid, sulfuric acid, has been found to be unsuitable for use in this fashion. When sulfuric acid contacts the ammonium nitrate in the ammonia-ammonium nitrate solution—prior to its neutralization by the free ammonia—the nitrate salt is decomposed into ammonium sulfate, nitrogen peroxide gas and free oxygen. The nitrogen peroxide is substantially entirely non-recoverable in the usual type of fertilizer manufacturing equipment and represents an economic loss as well as a hazard due to its noxious nature. In addition to promoting decomposition of the ammonium nitrate, concentrated sulphuric acid attacks potassium chloride, the usual source of potash used in complete mixed fertilizers. The potassium chloride reacts with sulfuric acid to form potassium sulphate and highly voltaile hydrogen chloride. The latter then combines with any free ammonia present to form ammonium chloride. The result is a further loss of nitrogen in the form of an ammonium chloride aerosol. Furthermore, hydrochloric acid in the presence of moisture severely corrodes the metallic components of the mixing equipment.

A solution to this problem was devised by Derrick H. Stassford, Everett N. Mortenson and Marion D. Sanders and is disclosed and claimed in U.S. patent application Ser. No. 498,742, filed April 1, 1955, now Patent No. 2,965,468, issued December 20, 1960, the disclosure of which is incorporated herein by reference, wherein they teach that aqua ammonia may be added to the sulfuric acid to displace the first hydrogen (the highly active hydrogen) of the acid to produce ammonium-acid sulfate. The ammonia-ammonium nitrate solution may then be added to the ammonium-acid sulfate without the undesirable effects encountered when the ammonia-ammonium nitrate solution is added directly to the sulfuric acid, particularly in the presence of potassium chloride. They propose that this "taming" of the acid by ammonia before the ammonia-ammonium nitrate solution is added be carried out in an apparatus such as that disclosed in the Pearce et al. Patent No. 2,755,176 or in the Davenport Patent No. 2,618,546. The problem that is encountered in practicing the invention of Patent No. 2,965,468 by the procedures and apparatus described therein is that of the corrosive effect of the process on the apparatus employed. The reaction of the ammonia with sulfuric acid liberates large quantities of heat and the effect of the acid at elevated temperatures on nearly any substance forming the apparatus is such as to destroy the substance. As a result, equipment life is extremely short.

The principal object of the present invention is to provide a method and apparatus for carrying out the partial neutralization of sulfuric acid so that the ammonia-ammonium nitrate solution may be safely added thereto, that overcomes the problems encountered in attempting to carry out this step by the prior teachings. A further advantage of our invention lies in the fact that we have eliminated one of the steps and pieces of equipment involved in otherwise carrying out the procedures of Patent No. 2,965,468, while still carrying out the same chemical reactions. Obviously this simplifies the operations and reduces the amount of equipment that must otherwise be acquired and maintained. A further advantage of the invention is in the desirable agglomerating property of the ammonium-acid sulfate formed during the processing.

Briefly the process we have devised comprises the steps of forming a rolling bed of fertilizer solids flowing in one direction with a flow of air passing countercurrent to the stream of solids, injecting a concentrated mineral acid, such as sulfuric acid or phosphoric acid, at one point along the stream, and injecting an ammonia-ammonium nitrate solution at a point downstream of the acid injection point.

To carry out this process we have devised an injection apparatus for introducing fluids (gaseous or liquid) into the rolling bed of solids in a drum such as a kiln, etc. While the principles of this apparatus might be advantageously employed in other fields, it is of great importance in carrying out the present invention. It insures a distribution of the fluid within the rolling bed of solids such as to obtain the necessary partial neutralization of the acid before the acid comes into contact with the ammonia-ammonium nitrate solution. It has the further advantage that the loss of fluid, that is the amount of fluid escaping from the bed of solids, is minuscule.

Other objects and advantages will become apparent from the following description taken in conjunction with the drawings, in which.

Figure 1:
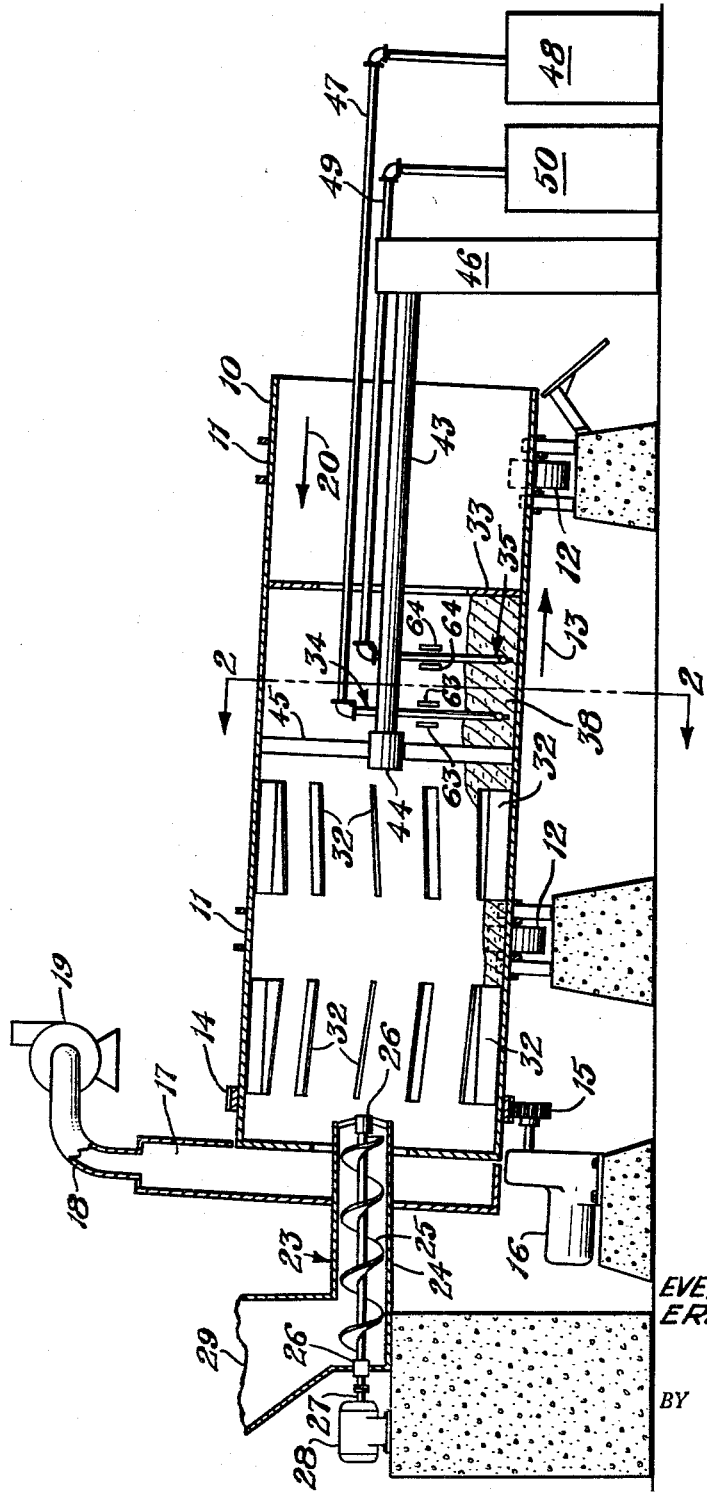
FIGURE 1 is a side view in section and partially diagrammatic illustrating an embodiment of the present invention.

The process of the preferred embodiment of the present invention is as follows: The fertilizer solids, containing superphosphates and potash, which are to be ammoniated with an ammonia-ammonium nitrate solution as the source of nitrogen in the complete fertilizer are charged into a rotary mixing drum. These solids are tumbled in the drum and then form a rolling bed, sometimes termed a kiln roll, flowing in a direction away from the point at which the solids are charged into the drum. Air is drawn through the mixing drum in a direction countercurrent to the flow of the solids bed. At a point in the drum sulfuric acid is introduced to ultimately neutralize the free ammonia in the ammonia-ammonium nitrate solution introduced a short distance, preferably in the range of 1–4 feet, downstream of the point at which the acid is introduced and to fix the ammonia in the solids in the form of ammonium sulfate.

When the acid emerges from its point of injection it thoroughly and uniformly saturates the surfaces of the solids particles in a cross-sectional segment in the mixing drum just downstream of the point of injection. By reason of the rolling of the bed of solids a relatively even distribution of the acid on the solids is obtained. The acid-wetted particles become neutralized almost immediately to ammonium-acid sulfate, the concentrated ammonia vapor from the injection point of the ammonia-ammonium nitrate solution being brought back to the portion of the drum where the solids were wetted with the acid by the countercurrent flow of air. As the ammonia-ammonium nitrate solution discharges from its injection point downstream of the acid injection point, it wets the hot solids in the cross-sectional segment just upstream of its point of injection. When the ammonia-ammonium nitrate solution contacts hot solids (carrying the already partially neutralized acid) which have been flowing downstream toward the point of the injection of the ammonia-ammonium nitrate solution, the free ammonia in the ammonia-ammonium nitrate solution vaporizes almost immediately. Some of the ammonia liberated at this point acts to complete the neutralization of the ammonium-acid sulfate to normal ammonium sulfate and another portion of the ammonia is carried upstream by the countercurrent flow of air to contact particles freshly wetted with the sulfuric acid and to partially neutralize the acid to the ammonium-acid salt and to heat the solids. These hot solids (bearing the ammonium-acid sulfate) then move downstream to volatilize additional ammonia-ammonium nitrate solution and become completely neutralized to ammonium sulfate. Thus by this process it is seen that no raw or unneutralized acid comes into contact with the ammonium nitrate in the ammoniating solution. From the point of injection of the ammonia-ammonium nitrate solution the solids, bearing the ammonium sulfate and ammonium nitrate, move on down the mixing drum.

This process has the advantage of utilizing only a single source of ammonia, i.e. the ammonia-ammonium nitrate solution, both to partially neutralize the acid to the ammonium-acid sulfate by displacing the first hydrogen of the acid and thus making it possible to further neutralize the ammonium-acid sulfate to normal ammonium sulfate without ammonium nitrate breakdown. Some of the ammonia also react with the superphosphates in the solids mixture. By "the first hydrogen," we mean the hydrogen responsible for the unusually high activity of raw acid. It is the first hydrogen of sulphuric acid, for example, that causes the attack on ammonium nitrate and potassum chloride. The second hydrogen is considerably less active. It has an ionization constant of only about $1.2 \times 10^{-2}$ as compared with $4 \times 10^{-1}$ for the first hydrogen.

Referring to the drawings, a cylindrical drum 10 has a plurality of tracks 11 about the periphery thereof. The tracks 11 ride on a plurality of rollers 12. The rollers are mounted so that drum 10 slopes downwardly in the direction indicated by arrow 13. A ring gear 14, attached to drum 10 and engaged by a pinion 15 on the output shaft of a suitable power source 16, is used to rotate the drum 10. About the upper end of drum 10 is an enclosed chamber 17 connected by a pipe 18 to the suction side of a blower 19 for creating a flow of air through the drum 10 in the direction indicated by arrow 20.

A suitable feeder generally 23 is employed to introduce the fertilizer solids into drum 10. Feeder 23 comprises a cylindrical tube 24 in which is a screw conveyor 25 mounted in bearings 26. The shaft 27 of the screw conveyor is connected to a power source 28. A hopper 29 directs the fertilizer solids into the tube 24 and screw conveyor 25.

In the upper end of the drum 10 are a plurality of lifting flights 32 to raise and tumble the fertilizer solids in the drum 10. The fertilizer solids in addition to being tumbled will, of course, move in the direction of arrow 13 because of the slope of the drum. Farther downstream from flights 32 is a ring 33 forming a dam for the solids. Between dam 33 and flights 32 are a pair of fluid injectors generally 34 and 35. Each of the injectors is identical in construction and a description of the injector 34 will adequately describe the structure of injector 35.

Figure 2:
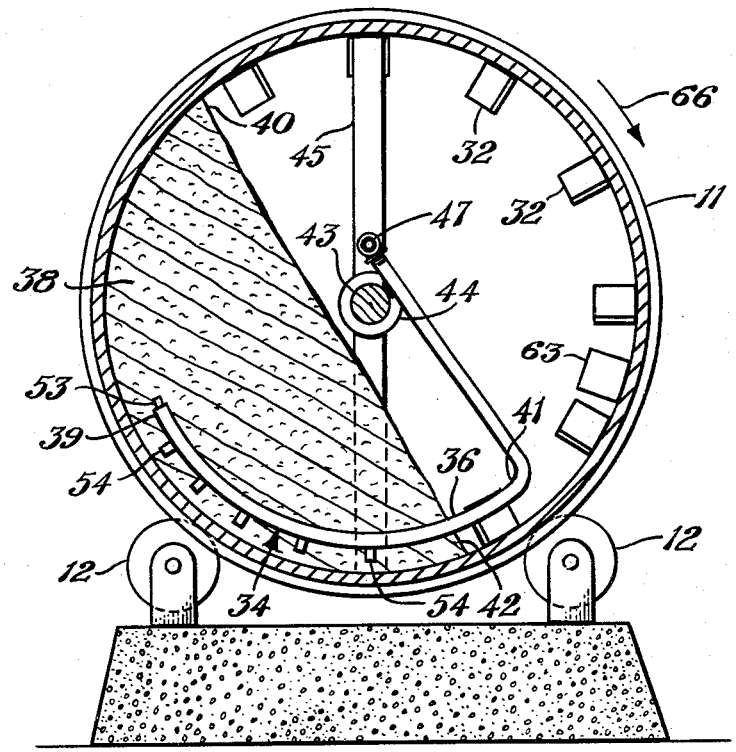
FIGURE 2 is an enlarged section taken at line 2—2 of FIGURE 1.

Injector 34 comprises a pipe or conduit 36 which may be designated as being generally sickle-shaped. The solids behind dam 33 will form what is commonly termed a "kiln roll" of solids as a result of the rotation of the drum. This kiln roll is illustrated by the portion of the solids 38 in FIGURE 2. The upper end 39 of the curved portion of conduit 36 is positioned to be below the top edge, as illustrated by point 40, of the kiln roll of solids. The opposite end 41 of the conduit is positioned so as to be at or beyond the bottom edge 42 of the kiln roll of solids. The portion of pipe 36 between points 39 and 41 is curved so as to be generally circumferentially parallel to the inner wall of drum 10. From point 41 conduit 36 extends upwardly to be attached to a shaft 43. Shaft 43 is suitably journaled in a bearing 44 mounted on a strut 45 in drum 10. The other end of shaft 43 is attached to a suitable mounting illustrated diagrammatically by post 46 to position the shaft axially of drum 10 and hold the shaft against rotation. Conduit 36 communicates with a pipe 47 connected to the source 48 of fluid to be injected. Similarly injector 35 connects by means of a pipe 49 to a source of fluid 50.

Figure 3:
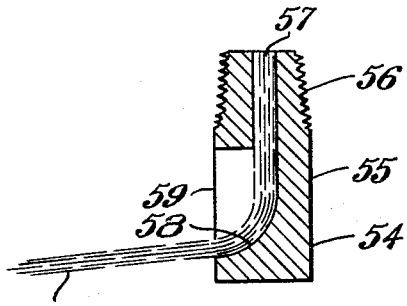
FIGURE 3 is a vertical section of one of the nozzles employed in connection with the present invention.

A nozzle 53 is attached to the end 39 of conduit 36. A plurality of nozzles 54 are attached to the bottom of the curved portion of conduit 36. The normal positioning of the nozzles and the particular types of nozzles employed will depend upon the application to be made of the injector. When the nozzle 53 is employed it preferably should be positioned at about the deepest portion of the kiln roll. In carrying out the process previously described, we prefer not to use a nozzle at the end of the conduit 36 such as the nozzle illustrated at 53, but to obtain the injection of the fluid solely through the use of the bottom nozzles 54. These nozzles are positioned in the deepest part of the kiln roll of solids 38. The type of nozzle we prefer for this application is a nozzle manufactured by Spraying Systems Co. of Bellwood, Ill., and one which they refer to as a "flooding type" nozzle. The nozzle is illustrated in section in FIGURE 3. It consists of a body 55 having threads 56 at one end thereof whereby it may be screwed into conduit 36. A passageway 57 directs the fluid from the conduit at a curved base 58 from which the fluid is deflected to a side opening 59. This type of structure produces a fan-shaped, flat, spray 60. The nozzles are mounted in conduit 36 so that the flat spray 60 is fanning out generally in a plane roughly tangent to a circle inside and concentric with the inner wall of drum 10. Preferably the nozzles are positioned so that with alternate nozzles the spray is directed upstream of the flow of solids (indicated by arrow 13) and downstream with respect to the flow of solids.

We have devised what might be termed cleaning forks to prevent large encrustations from developing on the sides of conduit 36. These forks consist of pairs of plates 63 attached to the wall of the drum 10 and positioned to pass adjacent each side of conduit 36. A similar pair of plates 64 are mounted so as to prevent large encrustations from developing on the conduit of injector 35. As the drum rotates with the injectors being held in a fixed position by shaft 43, the plates 63 and 64 pass along each side of the curved portion of the conduit, i.e. the portion that will be within or adjacent the flow of solids 38. As encrustations start to build up on the sides of the conduits these encrustations will be dislodged by the movement of the plates with respect to the conduit. The forks also serve the purpose of acting as lifting flights to cause any large chunks of material, that may build up and roll along the bottom of the kiln roll where they may become obstructed behind the portion of the injector at the bottom of that roll, to be lifted up over the obstructing portion of the injector.

The sickle injection apparatus is important in preventing the leakage of the fluids from the bed of solids. With the conventional types of injection apparatus a furrow is plowed through the bed of solids by the injection member, which furrow is immediately adjacent the area in which the fluids are being injected and which causes an easy path for some of the fluids to escape from the bed. With the sickle type of injector that we have devised the only possibility of a furrow is between the point at which the end 41 of the conduit 36 projects from the bed of solids and the bottom edge 42 of the bed of solids. Thus this furrow is insignificant in size and furthermore it is greatly removed from the area in which the actual injection is taking place (as represented by the nozzles 54).

In carrying out the process of partially neutralizing the sulfuric acid before contacting the acid with the ammonia-ammonium nitrate solution, the apparatus is operated as follows: Blower 19 is energized to create a flow of air in the direction indicated by arrow 20. Power source 16 is energized to rotate the drum in the direction indicated by arrow 66 (FIGURE 2) and power source 28 is energized to feed fertilizer solids into the drum. These fertilizer solids may be superphosphates, or concentrated superphosphates, along with muriate of potash, depending upon the particular material to be produced. Injector 34 is connected to a source of concentrated sulfuric acid represented by 48, and injector 35 is connected to a suitable source of ammonia-ammonium nitrate fluid illustrated at 50. As the solids move past injector 34 the sulfuric acid will be sprayed into the deep part of the kiln roll of solids. However, with the continual movement of the roll up the wall of drum 10 and back down the slope of the kiln roll (with the internal movement roughly corresponding thereto) an excellent distribution of the sulfuric acid onto the solids is obtained.

In starting up, as this sulfuric acid on the solids reaches the spray area of injector 35 it will be contacted with the ammonia-ammonium nitrate solution. There will be a brief period of time in the starting when the undesirable effects of contacting sulfuric acid with ammonia-ammonium nitrate solution results. The reaction of the sulfuric acid with the ammonia-ammonium nitrate solution will create a substantial quantity of heat, which heat will then commence vaporizing a portion of the ammonia in the ammonia-ammonium nitrate solution. This ammonia will be carried upstream (with reference to the movement of the solids as indicated by arrow 13) by the countercurrent air movement as indicated by arrow 20. The ammonia upon moving upstream will partially neutralize the sulfuric acid on the solids adjacent injector 34 to produce ammonium-acid sulfate. When the ammonium-acid sulfate moves downstream by the flow of solids, it is then contacted by the ammonia-ammonium nitrate solution to produce ammonium sulfate. The ammonium sulfate along with the ammonium nitrate then continues moving downstream to and over dam 33.

Thus in continuous operation the ammonia-ammonium nitrate solution introduced by injector 35 acts as follows: A portion of the ammonia is vaporized to move countercurrent to the solids flow to partially neutralize the acid adjacent injector 34. The remainder of the ammonia completes the neutralization of the acid on the solids that have about reached injector 35 with the ammonium nitrate merely being deposited on the solids at injector 35 and moving off downstream with the flow of solids.

While the same quantities of heat are produced as would be produced by carrying out this reaction by other methods and means, the heat is in the bed of solids and not in reaction apparatus that would be affected thereby. Furthermore, only a single source of ammonia is required, namely the ammonia-ammonium nitrate solution, which is a relatively inexpensive source of this material, yet by means of this process the ammonium nitrate does not come into contact with the sulfuric acid.

Our invention attains the desideratum of agglomerating the solids in the reaction chamber. When the ammonia vaporized at injector 35 moves upstream to contact the sulfuric acid from injector 34, ammonium-acid sulfate is formed. This salt has remarkably high solubility in hot water. For instance at 212° F., one pound of water will dissolve 11.5 pounds of ammonium-acid sulfate. This solution also has a high boiling point—about 330° F. Hence, when the acid is neutralized at injector 34 to form ammonium-acid sulfate, this serves to elevate the solids bed temperature at this point to fairly high temperatures, in the neighborhood of 220–290° F., without driving off all the water. The ammonium-acid sulfate exists as a concentrated solution and accomplishes agglomeration as it rotates through the kiln roll of solids. The function of the ammonium-acid sulfate as an agglomerating agent will even take place in the absence of water above 297° F.

since at this temperature the ammonium-acid sulfate exists in a molten phase.

Following this agglomerating step, the ammonium-acid sulfate contacts further free neutralizing ammonia as it moves downstream. When the additional ammonia is absorbed by the hot ammonium-acid sulfate saturated granules, the ammonium-acid sulfate is converted to the relatively less soluble ammonium sulfate. For example, at 212° F. one pound of water will dissolve only one pound of normal ammonium sulfate. We have found that this remarkable change in solubility enables the staged addition of ammonia to cause the remaining water in the original agglomerating mixture to evaporate instantaneously and be carried away with the countercurrent flow of air. Likewise, the plastic mass of freshly agglomerated solids becomes converted to hard, dry granules almost instantly.

The foregoing detailed description is only for clearness of understanding and for the purpose of complying with 35 U.S.C. 112, and we do not desire to be limited to the exact details shown and described for obvious modifications will occur to persons skilled in the art.

We claim:

1. In the manufacture of a mixed fertilizer using ammonia-ammonium nitrate solution as the source of nitrogen, the process comprising forming a stream of fertilizer solids flowing through a reaction zone, passing a flow of air in said zone counter-current to said stream of solids, introducing a concentrated mineral acid selected from the group consisting of sulphuric acid and phosphoric acid into said stream at an upstream point in said zone, and introducing ammonia-ammonium nitrate solution into said stream at a point downstream of the introduction of said acid, whereby a portion of the ammonia of said solution will be vaporized downstream and the vapors carried upstream by said countercurrent flow of air to partially neutralize said acid moving in said stream to form an acid salt and to heat the solids for the vaporization of ammonia at said downstream point, and said acid salt will move downstream and agglomerate said solids and react with another portion of ammonia from said solution to completely neutralize the acid salt to produce a normal ammonium salt.

2. In the manufacture of a dry granulated mixed fertilizer containing sources of available $P_2O_5$ and N wherein the latter is derived from ammonia-ammonium nitrate solution, the method of providing a ratio of available N and $P_2O_5$ of about 1 to 1 which comprises forming a stream of fertilizer solids flowing in a given direction, passing a flow of air countercurrent to said stream, introducing concentrated sulfuric acid into said stream at a first point, and introducing ammonia-ammonium nitrate solution into said stream at a second downstream of said first point, whereby a portion of the ammonia of said solution will be vaporized at said second point to be carried upstream by said countercurrent flow of air to displace the first hydrogen of said acid moving in said stream from said first to said second point to produce ammonium acid sulfate and to heat said solids for the vaporization of ammonia at said second point, and said ammonium acid sulfate will move in said stream of solids to said second point and react with another portion of ammonia from said solution to produce normal ammonium sulfate.

3. In the manufacture of a mixed fertilizer wherein a concentrated mineral acid from the group consisting of sulfuric acid and phosphoric acid is introduced at a point into a stream of fertilizer solids flowing in a given direction the improvement comprising: passing a flow of air countercurrent to said stream; introducing ammonia-ammonium nitrate solution into said stream downstream of said point whereby a portion of ammonia from said solution will be vaporized downstream of said point and will be carried upstream to said point by said countercurrent flow of air to partially neutralize said acid to form substantially only ammonium acid salt; tumbling said acid salt in said solids to agglomerate said solids; and completely neutralizing said acid salt with an additional portion of ammonia from said solution when said acid salt flowing in said stream reaches said solution.

4. Apparatus for use in introducing a fluid from a source thereof into solids in the manufacture of fertilizer, said apparatus comprising a rotatable inclined drum, means at the high end of the drum for introducing fertilizer solids into the drum, means attached to the drum for rotating the drum in a given direction whereby said solids form a rolling bed of fertilizer solids inclined against a bottom side of the drum and having an upper and a lower line of said rolling bed, and means for introducing a fluid into said solids comprising a conduit for said fluid, said conduit being positioned generally circumferentially parallel to the wall of said drum from a first point within said rolling bed, which first point is spaced from one line thereof, to a second point beyond said rolling bed and extending at an angle to the longitudinal axis of said drum from said second point to said source of said fluid, said conduit having at least one nozzle thereon in the portion of the conduit within said rolling bed of fertilizer solids.

5. In apparatus for use in the manufacture of mixed fertilizers from fertilizer solids and fluid from a source thereof, which apparatus includes a rotating drum in which the solids form a rolling bed of fertilizer solids inclined against a bottom side of the drum as a result of the rotation of the drum, which rolling bed is defined by an upper and lower line, the improvement comprising: a member to inject fluid from the source thereof into said solids, said member comprising a conduit, said conduit being positioned generally circumferentially parallel to the wall of said drum from a point spaced inwardly of said rolling bed from one line thereof to a second point beyond said rolling bed at the opposite line thereof, said conduit extending at an angle to the longitudinal axis of said drum from said second point to said source of said fluid, said conduit having at least one nozzle thereon in the portion of the conduit within said rolling bed of fertilizer solids.

6. In apparatus for use in the manufacture of mixed fertilizers from fertilizer solids and fluid from a source thereof, which apparatus includes a rotating drum in which the solids form a rolling bed of fertilizer solids inclined against a bottom side of the drum as a result of the rotation of the drum, said bed having an upper and a lower line, the improvement comprising: a member to inject fluid from the source thereof into said solids, said member comprising a conduit, said conduit being positioned generally circumferentially parallel to the wall of said drum from a point below the upper line of said rolling bed to a second point outside the lower line of said rolling bed, said conduit extending generally normal to the longitudinal axis of said drum from said second point to said source of said fluid, said conduit having at least one nozzle thereon in the portion of the conduit within said rolling bed of fertilizer solids.

7. Apparatus for use in the manufacture of a mixed fertilizer from fertilizer solids and a source of a concentrated mineral acid and a source of ammonia-ammonium nitrate solution, said apparatus comprising a rotatable inclined drum, means at the high end of the drum for introducing the fertilizer solids into the drum, means attached to the drum for rotating the drum in a given direction whereby said solids form a rolling bed of fertilizer solids inclined against a bottom side of the drum and having an upper and lower line of said rolling bed with the solids flowing from the high end toward the low end of the drum, means to produce a current of air through said drum countercurrent to said flow, means connected to said source of acid for introducing said acid into said solids at a first point, and means connected to said source of ammonia-ammonium nitrate solution for introducing said solution into said solids at a point downstream of said first point with respect to said flow, each conduit being positioned generally circumferentially parallel to the wall of said drum from a location below the upper line of said rolling bed to a second location outside the lower line of said rolling bed, each of said conduits extending generally normal to the longitudinal axis of said drum from said second location to the respective source, each conduit having at least one nozzle thereon in the portion of the conduit within said rolling bed of fertilizer solids.

References Cited in the file of this patent

UNITED STATES PATENTS

| | | |
|---|---|---|
| 1,968,323 | Sperr | July 31, 1934 |
| 1,980,008 | Shoeld | Nov. 6, 1934 |
| 2,037,706 | Curtis | Apr. 21, 1936 |
| 2,600,253 | Lutz | June 10, 1952 |
| 2,618,547 | Davenport et al. | Nov. 18, 1952 |
| 2,701,193 | Heudier et al. | Feb. 1, 1955 |
| 2,729,554 | Nielsson | Jan. 3, 1956 |
| 2,885,279 | Mortenson | May 5, 1959 |